Nov. 5, 1957 W. P. WILSON 2,812,065
CLOTH DISCHARGE FILTER
Filed Feb. 25, 1955 3 Sheets-Sheet 1

FIG. I

INVENTOR.
WILLIAM P. WILSON
BY
HIS ATTORNEYS

Nov. 5, 1957 W. P. WILSON 2,812,065
CLOTH DISCHARGE FILTER
Filed Feb. 25, 1955 3 Sheets-Sheet 3
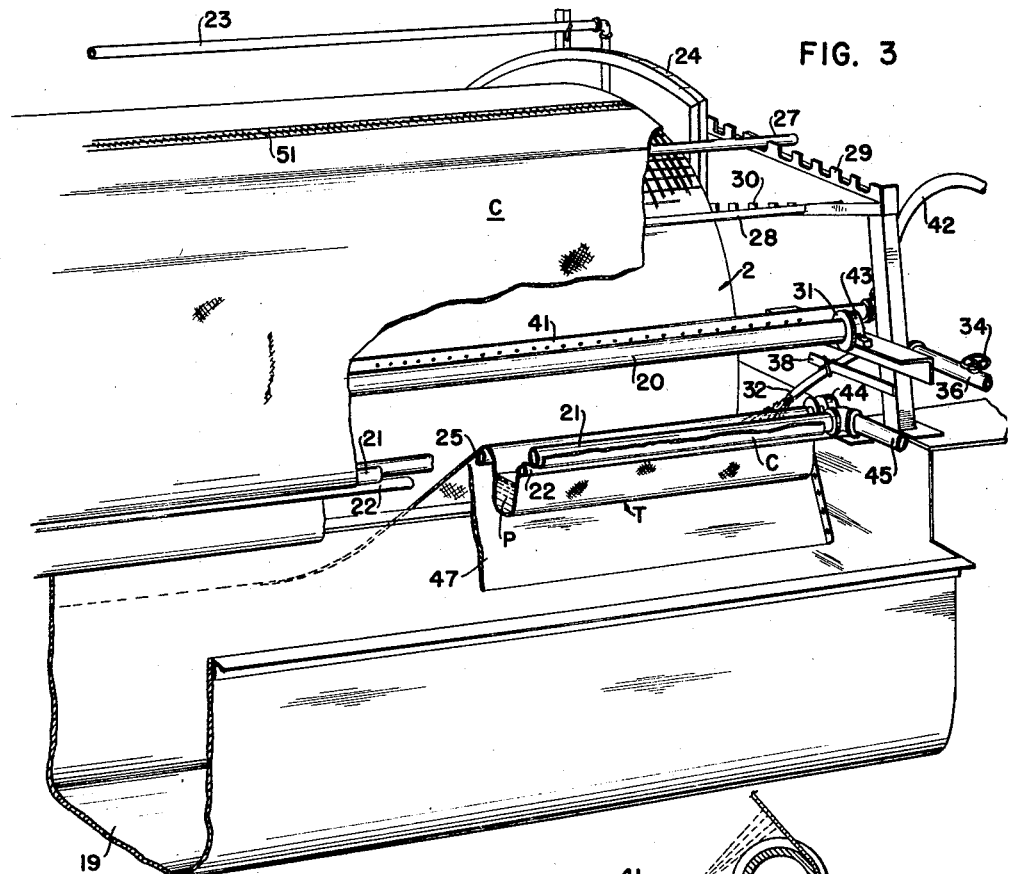
FIG. 3
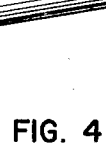
FIG. 4
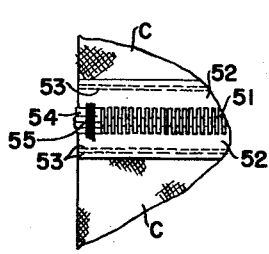
FIG. 5
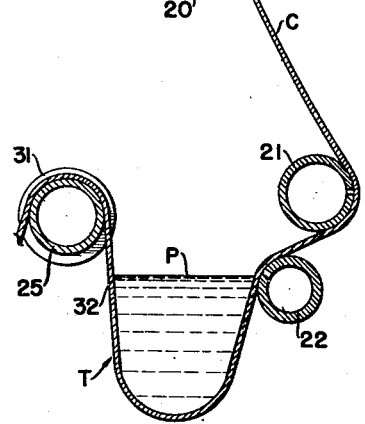
INVENTOR
WILLIAM P. WILSON
BY
Pennie, Edmonds, Morton, Barrows & Taylor
HIS ATTORNEYS United States Patent Office 2,812,065
Patented Nov. 5, 1957

2,812,065

CLOTH DISCHARGE FILTER

William P. Wilson, Carlsbad, N. Mex., assignor to United States Borax & Chemical Corporation, a corporation of Nevada Application February 25, 1955, Serial No. 490,637

13 Claims. (Cl. 210—393)

This invention relates to continuous filtering apparatus and, more particularly, to such apparatus wherein a rotary vacuum or suction drum having a foraminous or screen-like cylindrical surface is at least partially immersed in the liquid to be filtered (slurry) which is contained within a tub or tank, and an endless band in the form of a woven fabric having a length in excess of the circumference of the drum, is arranged to travel on the screen surface of the drum and is looped away from the drum at one side for removal or discharge of the filter cake and cleaning, after which the cloth returns to the drum.

Heretofore in operating filtering apparatus of this type difficulty has been experienced in causing the endless filter band, or cloth, to remain centered on the rotating drum. That is to say, the cloth in returning to the drum surface has had a tendency to run off of the drum to one side or the other, and a very important object of the present invention is to eliminate such difficulty in the tracking of the cloth on the drum.

A further object of the present invention is to provide proper tensioning of the endless band so as to ensure that the cloth lies smoothly on the drum surface.

Another object of the invention is effectively to discharge the filter cake from the cloth, removing substantially all of the particles of the cake from the interstices of the cloth so as to ensure that it is clean and in good filtering condition as it returns to the drum.

Heretofore in the filtration of liquids containing slimes of a gelatinous nature, or of a colloidal nature, such for example as the slimes present in concentrated sodium-potassium chloride solution, it has been necessary to employ a vacuum drum which was precoated with diatomaceous earth, or kieselguhr, in order to remove the particles of the colloidal clay, or material of that nature, present in such solution. The screen surface of the rotating drum was coated with a thick coat of the kieselguhr, and since it was necessary to continuously scrape off, with a specially constructed knife and knife feeding mechanism, a thin layer of the "precoat" as the filtering operation proceeded, such coat was removed in the course of a few hours, thereby necessitating shutting down the apparatus in order to apply a new precoat. With a three inch precoat the filter required recoating some three or four times in each twenty-four hours of operation.

Such a method of filtering is objectionable, both on account of the increased cost of operation of the filter, and because the shutting down of the filter for recoating decreased the amount of material which could be filtered in each twenty-four hours.

I have discovered that by employing an endless band, or cloth, of woven nylon, for example nylon taffeta of appropriate mesh, the same slimes can be successfully filtered. The nylon cloth has the special property of acting as an efficient filter for the slimes of the kind mentioned in this application without having them adhere to it; it is not only a good filtering medium but possesses good shedding qualities so that a mere washing with water removes such slimes.

The use of such a filter cloth has the advantage that the filtering apparatus can be maintained in operation for some days without replacement and, consequently, the frequent shutting down which is necessary with a precoat filter, and the loss of filtering time during recoating, are eliminated. Moreover, the cost of nylon cloth is very much less than the cost of the precoating. It will be understood that where an unusually clear filterate is important the nylon filter cloth can be used over a precoat of diatomaceous earth such as previously described. When so used, however, the knife feeding mechanism can be set to scrape off a very much thinner layer of precoat, so that the periods between shutdowns for applying new precoats, are very substantially increased.

The invention will be described in connection with an apparatus for filtering a concentrated sodium-potassium chloride solution which contains slimes or solids of a colloidal nature. It will be understood, however, that the apparatus can be used to filter other materials, and among other uses are to be found the processing of sugar juices, uranium ores, and in the refining of certain petroleum products.

Other objects and advantages of the invention will be apparent from the following description of the improved filtering apparatus as illustrated, by way of example, in the accompanying drawings.

In these drawings:

Fig. 3 is a perspective or projectional view of the right-hand portion of the apparatus as viewed from the right of Fig. 1 or from the top, left of Fig. 2;

Fig. 4 is an enlarged vertical section taken on line 4—4 of Fig. 2 to illustrate the relative positions of certain of the parts; and Fig. 5 is a view of a detail.

Figure 1:
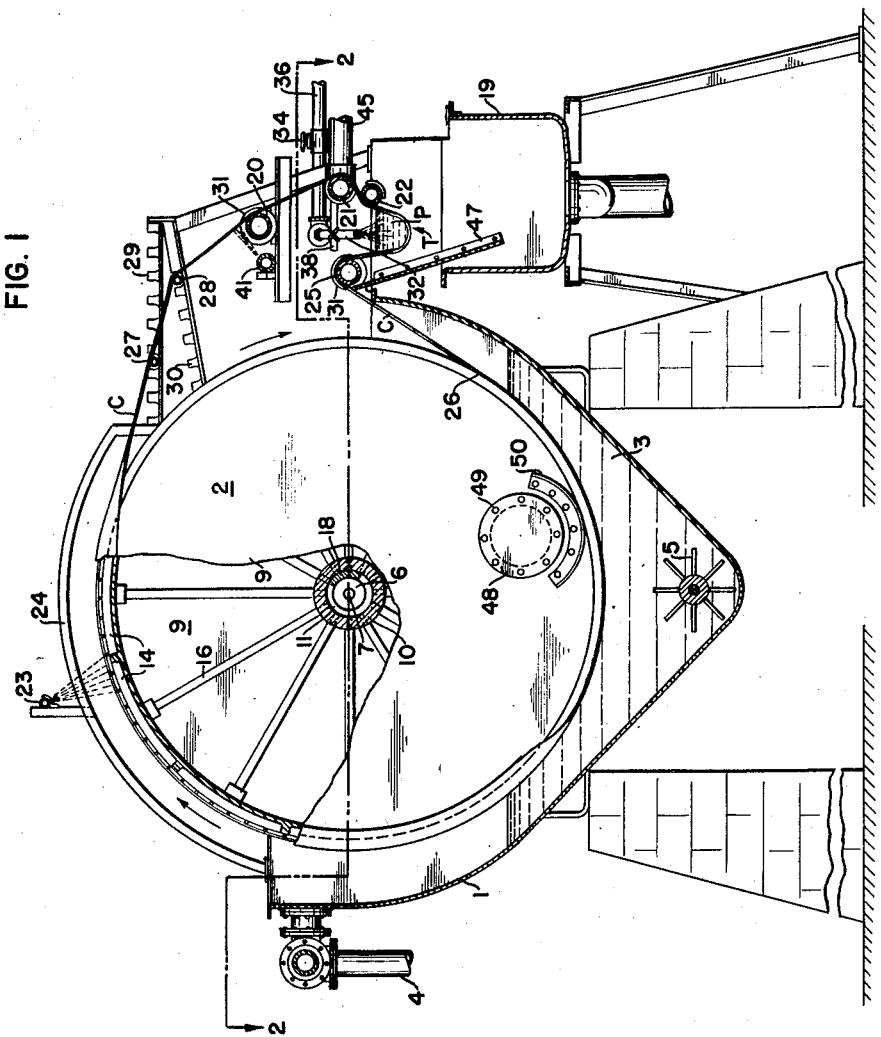
Fig. 1 is a transverse section of the apparatus as constructed for the purpose of filtering a slurry of concentrated sodium-potassium chloride solution.

Referring now to these drawings, the tank or tub is indicated by reference numeral 1, and the rotary vacuum or suction filtering drum by reference numeral 2. This drum has a cloth-supporting, foraminous cylindrical surface, and closed end walls. The foraminous surface may be made of wire mesh, wire wrap, punched plate, or the like. In the apparatus as it has been constructed this drum is some twelve feet in length, and the tank 1 is slightly longer and slightly wider, as illustrated in Figs. 1 and 2, in order to receive the drum and permit the lower portion thereof to be immersed in the body of slurry 3, the general level of which is indicated in Fig. 1.

Figure 2:
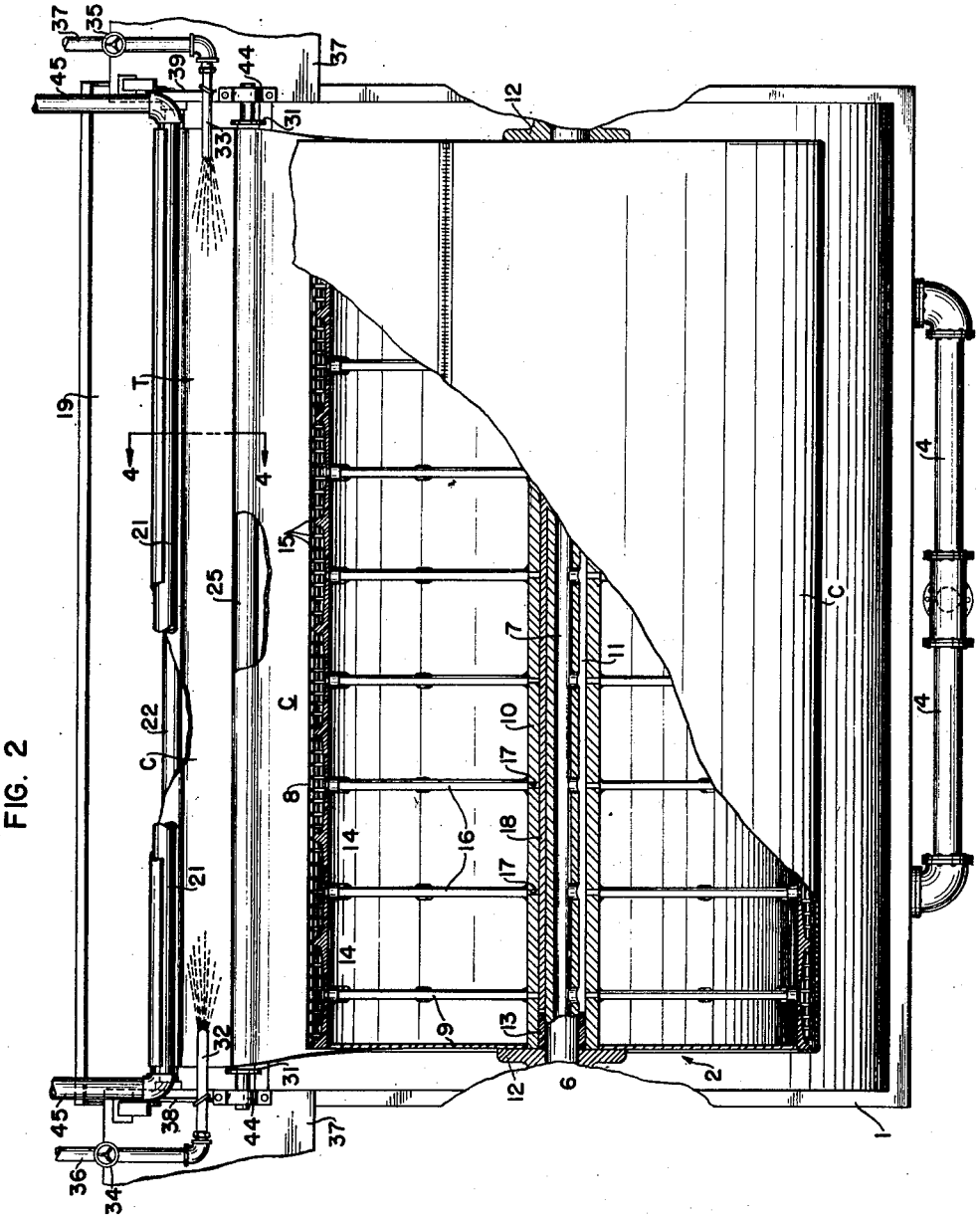
Fig. 2 is in part a plan view and in part a horizontal longitudinal section through the rotary drum, taken on broken line 2—2 of Fig. 1.

The slurry is fed into tank 1 by a feed pipe 4 having branches, as shown in Fig. 2, so as to equalize the delivery between the end portions of the tank. A suitable control valve (not shown) is provided for regulating the flow. A continuously operated rotary stirring device 5, located in the bottom of tank 1, maintains the solids in suspension in the body of slurry 3.

Filtering drum 2 rotates on a stationary hollow shaft 6 which is mounted on suitable supports (not illustrated), at its opposite ends. Connections are made to the interior passage 7 of the hollow shaft 6 at one or both ends with a filtrate collecting tank to which is connected a suitable source of suction such as a vacuum pump. These connections are made through the shaft supports in a conventional manner. These shaft supports also house a driving mechanism (not shown) by means of which the filtering drum 2 is continuously rotated during the operation of the apparatus.

The filtering medium comprises an endless band, or cloth C which is somewhat wider than the length of the filtering drum 2, its side edges overlapping the ends of the drum as indicated in Figs. 1 and 2. This endless cloth C is longer than the circumference of the drum and is looped away from the drum surface, as shown in Fig. 1, and carried over a series of supports and rollers, and the filter cake, or "mud", which collects on the surface of the drum during the filtering operation, is dislodged from it and discharged into a trough 19.

With drums of such great width a problem is presented in making the endless band C "track" as it feeds back onto the lower portion of the drum. This is particularly difficult with a filtering cloth of light weight material, such as nylon taffeta. Merely crowning the cylindrical surface of the drum is not satisfactory, with such light weight material, nor is the use of a tension roller satisfactory for keeping the cloth spread out.

In accordance with one aspect of the invention, the loop of the endless filtering cloth C is supported in such a manner as to provide a pocket, or trough formation T across the width of the cloth, and within this formation a pool of water P is maintained (Fig. 3). The pool, by its weight, provides the required tension in the cloth and the water also causes the cloth to feed in a smooth, spread-out condition onto the drum surface, as will be referred to later.

Drum 2 has a cylindrical screen surface 8 and is closed at its opposite ends by circular sheet metal plates 9 which are apertured at their centers to receive a sleeve member 10 which is concentric with stationary shaft 6 and spaced therefrom as shown in Fig. 1 to provide a passageway 11 for the filtrate. Sleeve member 10 is secured at its opposite ends to the end plates 9 by means of flanged members 12, the parts being both bolted and welded together to provide strength and to seal the interior of the drum from the atmosphere.

In order to rotatably support the drum collar members 13 are provided at each end of stationary shaft 6, and these collars also close the ends of the annular-like space 11 between shaft 6 and sleeve member 10. These two parts also include a valve structure to control the application of suction to the drum, as will presently appear. The driving mechanism for rotating the drum previously referred to is connected to the drum through the flanged members 12.

The cylindrical screen-like surface 8 of drum 2 is divided into sections or pockets 14 (Fig. 2) arranged in rows both circumferentially and longitudinally of the drum. The structure of screen surface 8 may vary considerably, but is preferably provided with spaced cylindrical ribs 15 to give it strength. Each of the pockets 14 is connected with the interior of the central sleeve member 10 by means of a suction pipe or tube 16.

The inner ends of these tubes may be secured to the outer surface of sleeve member 10 in any suitable manner as by welding as indicated in Fig. 2, and the interior of each tube connects with a radial passage 17 extending through the thickness of the sleeve to the interior thereof, that is, to the annular space 11. It will be understood from Figs. 1 and 2 that the arrangement is such that during the rotation of drum 2 the several longitudinal rows of pockets 14 will be connected, through their tubes 16 and passages 17, with the annular space 11 except during that portion of the rotation during which the passages 17 are blanked off or closed by means of a stationary arcuate valve member 18.

The endless filter cloth C contacts the drum at the approximate point where the drum enters the body of slurry 3, rotation being in the clockwise direction, and leaves the drum just to the right of the top. The filter cloth passes over two optional take-up bars to be referred to later and thence over a supporting roller 20, passing which it pitches downwardly at a steep angle and around the outside of a stationary cold water spray pipe 21 and thence over the inside surface of a hot water outside spray pipe 22, after which the filter cloth drops almost vertically downward and then upward again to form a trough T within which is maintained the body or pool of water P (see Fig. 3).

The inner side of the filter cloth comprising this trough formation T passes nearly vertically upward over a guiding roller 25 which redirects the cloth downwardly over the edge of tank 1 and then onto the surface of the drum at 26, which point, as mentioned before, is slightly above or approximately at the body of slurry 3. The rollers 20 and 25 may or may not be flanged at each end as indicated by numeral 31.

A filter cake wash spray pipe 23 is arranged lengthwise of the filtering drum 2 for the purpose of washing the cake after it has been raised on the surface of the drum and dewatered by the vacuum. This pipe is supported between suitable brackets which are mounted upon an arched frame 24 at each side of the apparatus.

In order to control, or regulate, the amount or length of the filter cloth in the trough formation T, one or more stationary adjusting rods 27, 28 may be provided. These may conveniently be made of lengths of pipe supported at their opposite ends by means of notched frames 29, 30 arranged one on each end of filter drum 2. By shifting one or both adjusting rods 27, 28 the depth of the trough formation T may be increased or decreased. Also these bars may be shifted to compensate for any stretching or shrinking in the length of the filter cloth C which may occur.

In order to maintain the pool of water P in the trough formation T of the filter cloth C a barrier for the water of the pool which tends to flow out of the trough formation at each end is provided. Such barriers may be in the form of dam members arranged near each side of the filter cloth, that is to say, adjacent each end of the trough formation. Advantageously, however, such barrier to the outflow of water at each end of the pool is provided by means of a stream of water under suitable, and adjustable, pressure directed in such a way as to oppose the outflow of water from the pool P at each end of the trough formation. Thus, for example, flexible hose members 32 and 33 may be arranged at each end of the trough formation T. An effective arrangement is to position the outlets of hose members 32 and 33 about six inches above the bottom of the trough formation T and also about six inches inwardly from the side edges of the cloth. The water streams emerging from the hose members should be directed approximately parallel to the bottom and sides of the trough. Hose members 32 and 33 may be supported, for example, by brackets 38 and 39.

Rigid pipe outlets in place of the flexible outlets 32 and 33 may be used, if desired, although the flexible outlets may assist in controlling the amount of water which may be desirable to permit to flow out of the opposite ends of the trough formation. Such control, however, is primarily effected by controlling the water pressure, and therefore, the velocity and amount of the water discharged from the respective members 32 and 33. This may be accomplished by means of hand valves 34 and 35 which control the flow of the water from supply conduits 36 and 37.

Adjacent the upper roller 20 and parallel to it there is arranged a spray bar or pipe 41 which is perforated with equally spaced holes as shown in Fig. 4 and directs a spray against the inner surface of the filter cloth C just before it passes over the upper roller 20. A supply of cold water is fed to spray pipe 41 through a hose 42 connected at one or both ends of the pipe as desired. This spray serves to loosen the filter cake on the exterior surface of the cloth C and also to lubricate the cloth in contact with roller 20. Anti-friction bearings 43 are, however, used for supporting roller 20, and similar bearings 44 for supporting the lower or tank edge roller 25.

The cold water inside spray pipe 21 is similarly provided with uniformly spaced apertures throughout its length, one of which is shown in section in Fig. 4. Water is fed to both ends through the supply pipe 45. The outside spray pipe 22 is just below pipe 21 and somewhat closer to the drum 2, and this pipe is also arranged with a series of equally spaced apertures which are directed upwardly at an angle of about 30° horizontal as shown in Fig. 4.

The spray from this pipe is directed against the outside surface of cloth C and it is preferably a hot water spray, the hot water supply being fed to both ends of pipe 22 through supply pipes (not shown).

The water in the pool P is supplied by the sprays from the two pipes 41 and 21, and the amount of water delivered by these sprays is made sufficient not only for the required washing of the cloth C, but to make up for the water which may flow from the opposite ends of the trough formation T according to the adjustment of valves 34 and 35. A discharge plate 47 for directing the released or dislodged filter cake into the trough 19 extends downwardly from a point adjacent and somewhat below the inside surface of the tank edge roller 25.

The drum 2 is provided with a manhole in each end which is closed by a cover 48 held in place by a ring of bolts 49. In shifting, the edges of the filter cloth C may hang over the edge of drum 2 and catch on these bolts. To prevent tearing of the cloth as it comes in tension to leave the drum, a guard member 50 having an outwardly extending flange is provided to lift the edges of the cloth away from the protruding bolts.

In the operation of the apparatus, it will be understood that the drum 2 rotates continuously at a uniform speed in the clockwise direction as indicated by the arrow in Fig. 1. From the time the filter cloth contacts the surface of the drum at point 26, until it leaves the drum just to the right of the top center, suction is being applied as previously described through the pockets 14, that is to say, there is a difference in pressure between the outside and inside surfaces of the filter cloth. Accordingly, the solids from the slurry 3 are drawn against the outside surface of the cloth and carried upwardly.

The layer of solids is dewatered by the suction until it reaches the cake washing spray pipe 23, and after passing this spray the solids are again dewatered by the suction. The loop in the cloth C then carries the filter cake to the right, over the bars 27, 28 past the spray pipe 41 and roller 20. At this point the spray on the inside surface loosens the solids and some of them descend along the surface of the filter cloth.

As the cloth passes the second inside spray pipe 21, the bulk of the solids is dislodged and discharged into the trough 19, the outside spray pipe 22 serving both to wash and scrape off the filter cake. The mesh of the filter cloth C is such as to allow the passage of a predetermined quantity of the water from the pool P, which completes the solids removal and cleansing of interstices of the cloth. The water pool P supplies the necessary tension to keep the endless cloth taut, and it causes the cloth to track evenly as it approaches or feeds back onto the drum, and also causes the cloth to feed onto the drum surface in a smooth, spread-out condition. The pool exerts a smoothing action which is uniform throughout the width of the cloth. This may be due to the mobility of the water forming the pool and to the fact that the water runs off or discharges at the opposite ends of the pool (the opposite edges of the filter cloth C), and that this motion of the water pushes the cloth outwardly to smooth and hold it in position as it rises over the tank or tub edge roller 25 and thence downwardly onto the drum.

The even tracking of the cloth on the drum is an important function of the water pool because if the cloth should run off the drum at one side or the other, it would expose vacuum openings in the surface of the drum and break the vacuum on the system. Due to the inequalities in the cloth and the tendency of the cloth to shift to one side or the other the employment of a pipe or roller for producing the cloth tension, would cause stretching of the cloth and tend to pull the sides inwardly and expose the drum surface, and also would not produce feeding of the cloth in a smooth and spread-out condition.

The amount of water discharged at the opposite ends of the trough formation T can be varied to vary the smoothing action, and also to cause a shift in the weight of the water in the pool towards one side or the other of the cloth, and thus provide an adjustment of the tension. When a new cloth is put on the drum such an adjustment is necessary, but no further adjustment is usually required during the life of the filter cloth.

The two ends of the endless cloth C are advantageously joined together by means of a hookless, or slide fastener 51 (Figs. 3 and 4). This type of fastener facilitates a quick change from an old to a new filter cloth, and also provides a light, strong seal between the ends of the cloth that will hold the pool and stand flexing over the various spray pipes and rollers, even when out of line due to shifting of the cloth.

A #5 weight brass slide fastener mounted on nylon tapes 52 is appropriate. Tapes 52 are sewn along the opposite end edges of the filter cloth C, each by means of a double run of stitches 53, using nylon thread. A conventional open end lock 54 is used at the starting end of the zipper, and a conventional locking end fastener (not shown), at the opposite end. Several stitches, as indicated by numeral 55, are made by hand to insure that the members of lock 54 do not become separated, and the locking end fastener at the opposite end is similarly secured in position by means of several hand applied stitches (not shown).

I have found that nylon taffeta fabric having a weight of about 4 ounces per square yard and woven with a thread of about 210 denier weight is especially well suited for the endless filter cloth C for filtering the slimes hereinabove mentioned in the apparatus as described. Before making this material into the endless filter cloth, however, it was preshrunk by treatment in boiling water. Such fabric has high tensile strength with little change in dimensions, either in length or width, due to wetting or change in temperature. Moreover, such nylon cloth has a permeability of about 12 cubic feet per minute of air, as measured by the Gurley Permeometer. With such a permeability the cloth will serve as a satisfactory filter for the slimes, and, at the same time will hold the pool of water P employed for smoothing and tensioning the endless cloth C in its operation on the filtering drum 2.

It will be understood that changes can be made in the construction and arrangement of the filtering apparatus as hereinabove described without departing from the scope of the present invention which is set forth in the appended claims.

I claim:

1. In a continuous vacuum filter having a tank, a rotary vacuum drum within said tank, an endless filter cloth the length of which is in excess of the circumference of the drum, and mechanism for applying the operating tension to said endless filter cloth comprising means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, the improvement which comprises means for forming a body of water within said trough of sufficient weight to produce the required tension in said endless filter cloth, said water body extending substantially the full width of said cloth.

2. In a continuous vacuum filter having a rotary drum, an endless filter cloth the length of which is in excess of the circumference of the drum, means at one side of the drum for supporting said excess filter cloth in the form of a trough extending from side to side of said cloth, the cloth being fed from the surface of the drum into said trough formation at one side thereof and being returned to the surface of the drum on the opposite side of said formation, the improvement in applying the operating tension to said endless filter cloth which comprises means for supplying water to said trough formation in greater quantity than will pass through the mesh of the cloth so as to build up a body of water within said trough formation of sufficient weight to produce the required tension in said endless filter cloth and cause said water to flow laterally of said cloth to exert a smoothing action thereon as it returns to the drum.

3. In a continuous vacuum filter having a rotary drum, an endless filter cloth the length of which is in excess of the circumference of the drum, means at one side of the drum for suspending a portion of said excess filter cloth in the form of a freely hanging trough extending from side to side of said cloth, the cloth being fed from the surface of the drum into said trough formation at one side thereof and being returned to the surface of the drum on the opposite side of said formation, the improvement in applying the operating tension to said endless filter cloth which comprises means associated with said supporting means for forming an open pool of water within said trough of sufficient weight to produce the required tension in said endless filter cloth, said forming means comprising water barriers disposed within said trough adjacent the respective opposite side edges of said filter cloth, and water supply means arranged to deliver water to said trough.

4. In a continuous vacuum filter having a tank, a rotary vacuum drum within said tank, an endless filter cloth the length of which is in excess of the circumference of the drum, means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, the improvement in applying the operating tension to said filter cloth which comprises means for supplying water to said trough formation, a shiftable barrier disposed within said trough formation adjacent each end thereof to cause said water to form a pool within said trough formation of sufficient weight to produce the required tension in said endless filter cloth, and means for adjusting said respective barriers to regulate the outflow of water from said pool at each side of said filter cloth.

5. In a continuous vacuum filter having a tank, a rotary vacuum drum within said tank, an endless filter cloth the length of which is in excess of the circumference of the drum, means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, the improvement in cleaning said filter cloth and applying the operating tension thereto which comprises means for forming a body of water within said trough of sufficient weight to produce the required tension in said endless filter cloth, said means including at least one spray pipe extending substantially from side to side of said cloth above said trough formation, the spray therefrom being directed against the inner surface of the cloth and descending and collecting within said trough formation.

6. In a continuous vacuum filter having a tank, a rotary vacuum drum within said tank, an endless filter cloth passing around the drum and having a length in excess of the circumference of the drum, means at one side of the drum for supporting said excess cloth in a trough formation extending from side to side of the cloth, the cloth being fed from the surface of the drum into said trough formation along one edge thereof and being returned to the surface of the drum from the opposite edge of said formation, the improvement in cleaning said filter cloth and applying the operating tension thereto which comprises at least one spray pipe extending substantially from side to side of said cloth above said trough formation, the spray therefrom being directed against the inner surface of the cloth and descending into said trough formation, a shiftable barrier disposed within said trough formation adjacent each end thereof to cause said spray to collect and form an open pool of water within said trough formation of sufficient weight to produce the operating tension in said cloth, and means for adjusting said respective barriers to regulate the outflow of water from said pool at each side of said filter cloth.

7. In a continuous vacuum filter having a tank, a rotary vacuum drum within said tank, an endless filter cloth passing around the drum and having a length in excess of the circumference of the drum, means at one side of the drum for supporting said excess filter cloth in a hanging trough formation extending from side to side of the cloth, the cloth being fed from the surface of the drum into said trough formation along one edge thereof and being returned to the surface of the drum from the opposite edge of said formation, and the inner surface of said cloth being on the inside of said trough formation, the improvement which comprises means for cleaning the filter cake from said cloth including an open pool of water maintained and supported entirely within said trough formation, the water of said spool passing through the mesh of said cloth solely by gravity to wash filter cake particles therefrom.

8. A continuous vacuum filter as claimed in claim 1 in which the endless filter cloth is composed of nylon taffeta.

9. A continuous vacuum filter as claimed in claim 1 in which the endless filter cloth is composed of nylon taffeta of about 210 denier and having a weight of about 4 ounces per square yard.

10. A continuous vacuum filter as claimed in claim 1 in which the endless filter cloth is composed of nylon taffeta of about 210 denier and having a permeability of about 12 cubic feet of air per minute as measured by the Gurley Permeometer.

11. A continuous vacuum filter as claimed in claim 1, in which the endless filter cloth is composed of a length of nylon taffeta having the opposite ends thereof secured together by means of a metallic slide fastener extending throughout the end edges of the cloth from side to side thereof.

12. A continuous vacuum filtering apparatus as claimed in claim 3, wherein the water barriers consist of streams of water disposed one adjacent each end of the said trough formation and directed to oppose the escape of water therefrom, and means for regulating the volume and velocity of said streams.

13. In a continuous vacuum filter having a tank, a rotary vacuum drum within said tank, an endless filter cloth passing around the drum and having a length in excess of the circumference of the drum, and two spaced parallel elongated supports at one side of the drum, said filter cloth travelling between them in a freely suspended trough formation extending from side to side of the cloth, the cloth being fed from the surface of the drum over one of said supports into said trough formation and being returned over the second support to the surface of the drum, the improvement in cleaning said filter cloth and applying the operating tension thereto which comprises means acting on said filter cloth after it leaves the drum and before it passes over said first elongated support for removing the bulk of the filter cake, and means for removing the remainder of the cake which includes a body of water maintained within said trough formation of sufficient weight to produce the operating tension in said filter cloth, at least a portion of said water passing through the mesh of the cloth.

References Cited in the file of this patent

UNITED STATES PATENTS

| | | | |
|---|---|---|---|
| 82,735 | Merrill | Oct. 6, | 1868 |
| 445,371 | Jewell | Jan. 27, | 1891 |
| 777,316 | Tittel | Dec. 13, | 1904 |
| 877,631 | Clark | Jan. 28, | 1908 |
| 1,401,199 | Simpson | Dec. 27, | 1921 |
| 2,654,482 | Robinson et al. | Oct. 6, | 1953 |

FOREIGN PATENTS

| | | | |
|---|---|---|---|
| 748,663 | France | Apr. 25, | 1933 |
| 846,392 | Germany | Aug. 11, | 1952 |